United States Patent [19]

Simancik et al.

[11] 4,235,123
[45] Nov. 25, 1980

[54] AUTOMATIC TRANSMISSION MANUAL SHIFT CONTROL ASSEMBLY WITH A PARK LOCK MECHANISM

[75] Inventors: Carl D. Simancik, Troy; Kenneth M. Zemke, Lake Angelus, both of Mich.

[73] Assignee: General Motors Corporation, Detroit, Mich.

[21] Appl. No.: 2,667

[22] Filed: Jan. 11, 1979

[51] Int. Cl.³ .................. G05G 13/00; G05G 5/06; G05G 5/00; E05B 65/12
[52] U.S. Cl. .................................. 74/475; 74/537; 74/878; 70/247; 70/239
[58] Field of Search ............ 74/878, 477, 475, 476, 74/483 K, 538, 483 PB, 537, 504; 70/247, 248, 239, 245, 252, 202, 203, 205, 207, 255, 238; 192/4 A

[56] References Cited

U.S. PATENT DOCUMENTS

| | | | |
|---|---|---|---|
| 1,646,970 | 10/1927 | Martel | 70/248 |
| 1,762,116 | 6/1930 | Bolles et al. | 70/247 |
| 1,827,732 | 10/1931 | Conlan | 70/239 |
| 2,147,613 | 2/1939 | Sandberg | 70/239 |
| 3,590,613 | 7/1971 | Kimberlin et al. | 70/248 |
| 3,625,032 | 12/1971 | Muhleck | 70/202 |
| 3,765,262 | 10/1973 | Mendenhall et al. | 70/248 |
| 3,939,939 | 2/1976 | Okazaki | 70/247 |
| 3,998,109 | 12/1976 | O'Brien | 74/538 |

*Primary Examiner*—C. J. Husar
*Assistant Examiner*—Philip W. Thor
*Attorney, Agent, or Firm*—Donald F. Scherer

[57] ABSTRACT

A floor mounted transmission control movable to a plurality of operating modes for controlling an automatic transmission has a lock rod controlled by a steering column mounted ignition lock and switch control which prevents the release of a detent mechanism thereby prohibiting movement of the transmission control from the "Park" mode unless the ignition switch has been moved from the "Lock" position. The connection between the ignition switch and the lock rod is by way of a flexible cable. The manual control detent mechanism has a stop member associated therewith which prevents the lock rod from performing its function and the ignition switch from being moved to the "Lock" position until the "Park" mode is selected by the operator.

2 Claims, 5 Drawing Figures

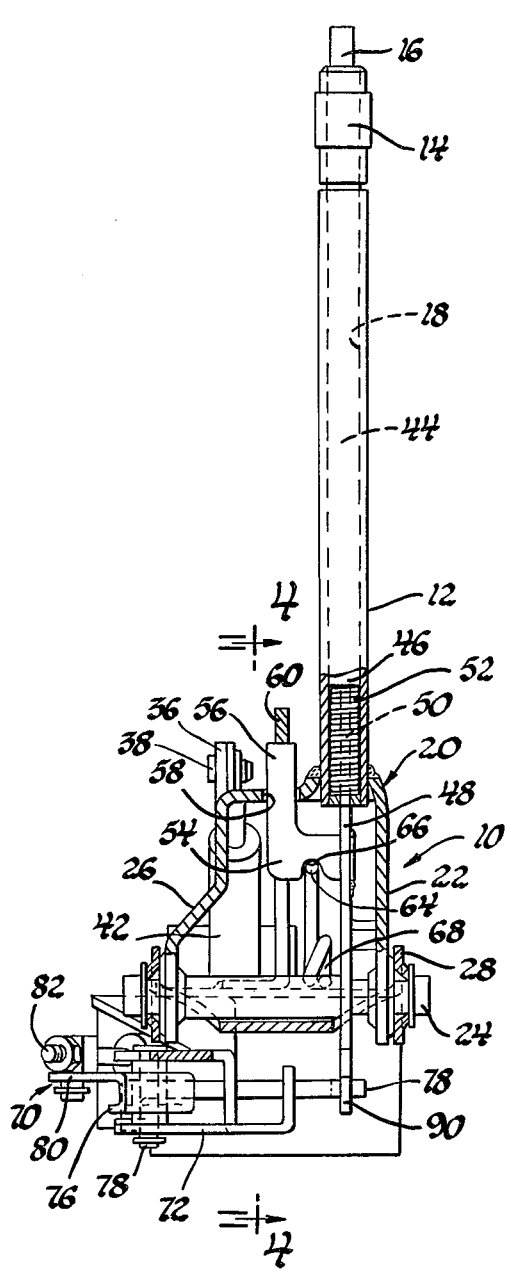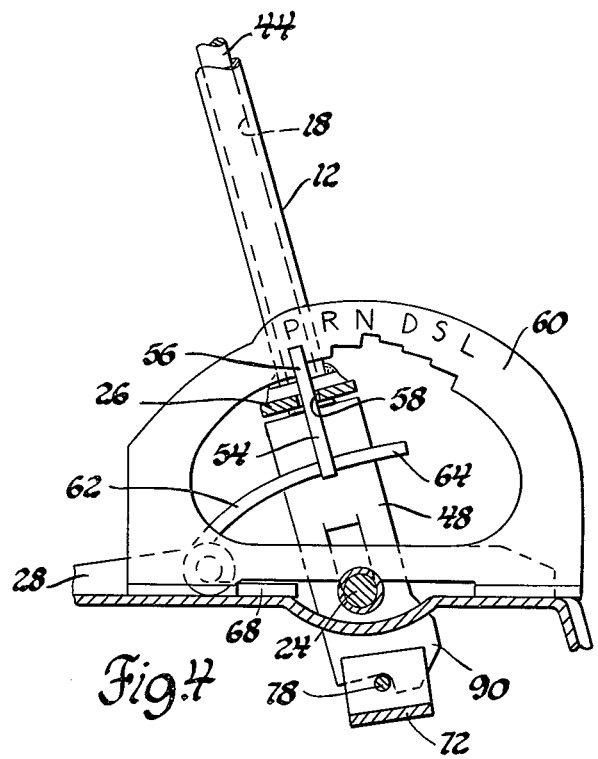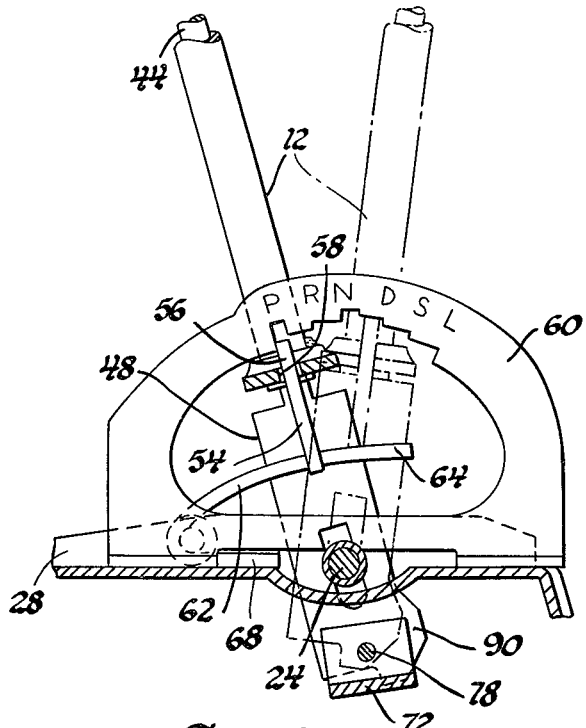

AUTOMATIC TRANSMISSION MANUAL SHIFT CONTROL ASSEMBLY WITH A PARK LOCK MECHANISM

This invention relates to manual shift controls for automatic transmissions and more particularly to manual shift controls that can be selectively locked in the "Park" mode to prevent unauthorized operation of the transmission.

It is an object of this invention to provide an improved lock mechanism for a floor mounted manual shift control mechanism.

It is another object of this invention to provide an improved floor mounted manual shift control lock mechanism wherein the lock mechanism is actuated by a steering column mounted actuating mechanism.

It is another object of this invention to provide an improved lock mechanism for a floor mounted shift control mechanism which is detented to "Park" position wherein the lock mechanism has a lock pawl actuated by an ignition control mechanism which prevents the release of the detent mechanism until the ignition control mechanism is actuated from the "Lock" position.

It is a further object of this invention to provide an improved lock mechanism for a floor mounted shift control mechanism which is detented to a "Park" position wherein the lock mechanism has a lock pawl actuated by an ignition control mechanism which prevents the release of the detent mechanism until the ignition control mechanism is actuated from the "Lock" position and wherein a stop plate is connected to the detent mechanism to prevent positioning of the lock pawl in the "Lock" position until the shift control mechanism is moved to the "Park" position.

These and other objects and advantages of the present invention will be more apparent from the following description and drawings in which:

FIG. 3 is a view taken along line 3—3 of FIG. 1;

FIG. 4 is a view taken along line 4—4 of FIG. 3; and

FIG. 5 is a view similar to FIG. 4 showing the detent mechanism actuated.

Figure 1:
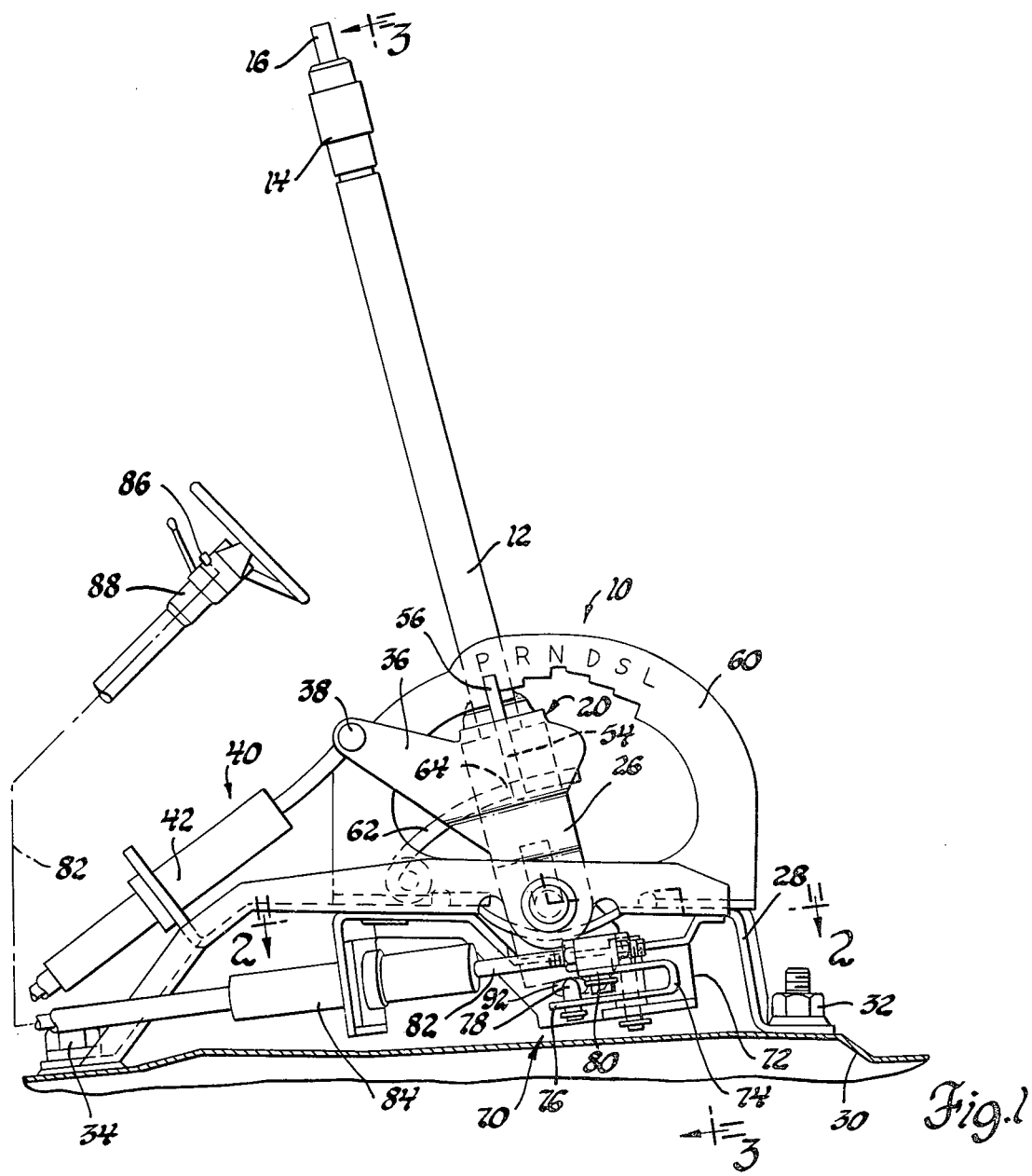
FIG. 1 is a side elevational view of a shift control mechanism with a diagrammatic connection to a steering column.

Referring to the drawings, wherein the same characters represent the same or corresponding parts throughout the several views, there is seen in FIG. 1 a shift control mechanism generally designated 10, having a shift lever 12 on which is disposed an operator handle 14 having a push button 16 slidably disposed in a button bore 18 which extends the length of the shift lever 12. The lower end of shift lever 12 has a bifurcated pivotal support bracket 20 secured thereto which bracket 20 has one leg 22 pivotally mounted on a pin 24 and a second leg 26 also pivotally mounted on the pin 24 which pin 24 is mounted in a support bracket 28 secured to the stationary portion 30 of a vehicle by fasteners 32 and 34. The leg 26 has an arm 36 integral therewith which is connected at 38 to a flexible cable assembly 40 adapted to be connected to the manual shift valve of an automatic transmission, not shown, in a conventional manner. The housing 42 of the cable assembly 40 is secured to the support bracket 28.

The button 16 has connected thereto a detent rod 44 which is slidably disposed in the button bore 18. The lower end 46 of the detent rod 44 is connected to an extension member 48 which is essentially rectangular in cross section, the upper end 50 of which is press fitted into a tightly coiled spring 52 which maintains the upper end 50 of member 48 centered in the button bore 18. An L-shaped detent engage bar 54 is secured to the member 48 such that, as best seen in FIG. 3, the upstanding leg 56 thereof extends through a rectangular slot 58 formed in leg 26. The detent bar 54 is urged into abutment with a detent interlock plate 60 by a bias spring 62 which has one leg 64 engaged in a notch 66 formed in detent bar 54 and another leg 68 maintained in abutment with the support bracket 28.

The bias spring 62 through the connection of detent bar 54 with member 48 urges the button 16 upwardly and is also operable to maintain the detent bar 54 in engagement with selected positions Park "P", Reverse "R" and drive positions "D", "S" and "L". As best seen in FIGS. 1, 4 and 5, the park detent position "P" is a rectangular slot such that the detent bar 54 must be depressed sufficiently, as shown in FIG. 5, prior to the shift lever 12 being moved from the "Park" position to any of the other positions. The only force which can be applied to disengage the detent bar 54 from detent plate 60 must come from the thumb of the operator which is a small force. Any shift force which is attempted by the operator is grounded to the detent plate 60 prior to disengagement of the detent bar 54 such that this force cannot be transmitted to the cable mechanism 40 until the detent bar 54 is disengaged from the detent plate 60.

Figure 2:
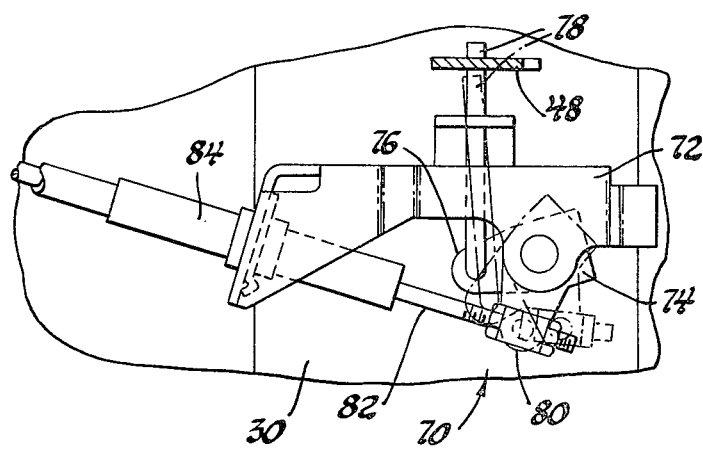
FIG. 2 is a view taken along line 2—2 of FIG. 1.

A lock mechanism 70, as best seen in FIG. 2, is secured to the bracket 28 and includes a mounting bracket 72 on which is pivotally mounted a bellcrank 74 having one arm 76 connected to a lock pawl 78 and another arm 80 connected to a flexible cable 82, the housing 84 of which is connected to the bracket 72. As seen in FIG. 1, the cable 82 is connected to an ignition actuating mechanism 86 disposed on a vehicle steering column 88. When the ignition switch 86 is in the "Lock" position and the shift control mechanism 10 is in the "Park" position "Park", the park pawl 78 is disposed beneath a stop plate 90 which is integral with the member 48. The lock pawl 78 is slidably disposed in a slot 92 formed in the bracket 72 and is therefore prevented from moving in the direction of the longitudinal axis of detent rod 44. If the ignition mechanism 86 is moved from the "Lock" position to the "On" or start position, the cable 82 causes pivoting of the bellcrank 74 such that the lock pawl 78 is removed from the underside of stop plate 90 thereby permitting longitudinal actuation of the detent rod 44 through the button 16.

In FIG. 5, it can be seen that the detent rod 44 has been depressed such that the detent bar 54 has been removed from the "Park" detent position. It can also be seen in FIG. 5, that when the detent rod 44 is depressed or the shift lever 12 is in a position other than "Park", the stop plate 90 extends downwardly past the lock pawl 78. With the detent bar 54 disengaged, the shift lever 12 can be moved to any of the other drive modes such as shown by the phantom lines in FIG. 5. When the shift lever 12 is in a position other than "Park", the lower end of stop plate 90, as seen in FIG. 5, is aligned with the lock pawl 78 thus preventing the lock pawl 78 from being moved to a position under the stop plate 90 when the shift lever 12 is not in the "Park" position. Thus, the operator cannot turn the ignition to the "Lock" position, since the lock pawl 78 will abut the surface of stop plate 90 preventing the ignition actuator from being moved, unless the shift lever 12 is first moved to the "Park" position. With the shift lever 12 in the "Park" position, and the ignition actuator in the "Lock" position, the detent rod 44 cannot be depressed because of its abutment through member 48 with lock pawl 78 thereby preventing disengagement of the detent bar 54 from the detent plate 60. Since, under these conditions, the only force the driver or operator can impose on the member 48 to disengage the detent bar 54 is through the push button 16 and is applied by the thumb, it is a relatively small force which cannot overcome the lock pawl 78 to permit disengagement of the detent bar 54. The larger pivoting forces which the operator can apply to the shift lever 12 to move the shift lever 12 from the "Park" position is prevented by the engagement of the detent bar 54 with the detent plate 60 so that these larger forces are not transmitted to the shift cable 40. Thus, unauthorized movement of the shift lever 12 is prevented when the ignition actuating mechanism 86 is in the "Lock" position.

The ignition actuating mechanism or switch 86 can be constructed in accordance with the locking mechanisms disclosed in U.S. Pat. No. 3,648,490 to Kimberlin et al, issued March 14, 1972, or in accordance with many of the conventional steering column locking mechanisms currently used for automotive vehicles.

The embodiments of the invention in which an exclusive property or privilege is claimed are defined as follows:

1. For use with an actuating mechanism having a "Lock" mode, in a transmission shift control mechanism including support means, a detent plate mounted on said support means and having a plurality of shift ratio detents and a "Park" detent, a shift lever having a handle end and a pivot end pivotally mounted on said support means, detent means having a detent engaging portion, a detent rod slidably mounted in said shift lever, biasing means for biasing said detent rod toward said handle end of said shift lever and for biasing said detent engaging portion to selectively engage said detents of said detent plate to thereby establish a gear ratio position, a button bore formed in said handle end, and a push button slidably mounted in said button bore and operatively connected to said detent rod and operative on manual movement thereof into said button bore to move said detent rod against the force of said biasing means to thereby move said detent means to detent released position, the improvement comprising a lock pawl slidably mounted on said support means, a lock cable operatively connected between said lock pawl and said actuating mechanism for moving said lock pawl into a "Lock" position corresponding to said "Lock" mode of said actuating mechanism when said detent engaging portion of said detent means is in its "Park" position, thereby preventing said detent engaging portion of said detent means from being removed from its "Park" position so long as said actuating mechanism remains in its "Lock" mode, and a stop plate operatively connected to said detent engaging portion of said detent means for pivotal movement therewith, said stop plate preventing movement of said lock pawl into its "Lock" position at all times except when said detent engaging portion is in its "Park" position.

2. A manual shift control assembly for a vehicle transmission wherein the vehicle ignition actuator is mounted on a vehicle steering column and is movable to selected positions and the transmission shift mechanism is mounted remotely from the steering column, said manual shift control assembly comprising; a manual shift lever pivotally mounted on a stationary support member for movement to a plurality of positions including a "Park" position and having a longitudinally movable detent rod including a push button at one end, a stop plate at the other end, and a detent bar intermediate the ends; a detent interlock plate secured to the stationary support member and disposed in operating relation with said detent engage bar and cooperating therewith to establish the plurality of positions; spring means for biasing said detent engage bar into engagement with said detent interlock plate such that when said shift lever is in the "Park" position, said shift lever cannot be pivoted unless said push button is depressed; locking means including a rotary member pivotally mounted on said stationary support member and having a first arm connected to said ignition actuator and a second arm; a lock pawl connected to said second member being selectively movable by said ignition actuator to have a portion thereof aligned with the longitudinal axis of said stop plate when said ignition actuator is in one of the selected positions and displaced from said stop plate when said ignition actuator is in any other of the selected positions, said ignition lock pawl engaging a side surface of said stop plate when said ignition actuator is moved from the other selected positions toward said one of the selected positions and said shift lever is in a position other than the "Park" position.

* * * * *